US012582925B2

(12) United States Patent
Gebauer

(10) Patent No.: US 12,582,925 B2
(45) Date of Patent: Mar. 24, 2026

(54) CHROMATOGRAPHY COLUMN COMPRISING AN INTERNAL BRACING

(71) Applicant: Cytiva BioProcess R&D AB, Uppsala (SE)

(72) Inventor: Klaus Gebauer, Uppsala (SE)

(73) Assignee: Cytiva BioProcess R&D AB, Uppsala (SE)

( * ) Notice: Subject to any disclaimer, the term of this patent is extended or adjusted under 35 U.S.C. 154(b) by 132 days.

(21) Appl. No.: 16/628,122

(22) PCT Filed: Jul. 5, 2018

(86) PCT No.: PCT/EP2018/068290
§ 371 (c)(1),
(2) Date: Jan. 2, 2020

(87) PCT Pub. No.: WO2019/011785
PCT Pub. Date: Jan. 17, 2019

(65) Prior Publication Data
US 2020/0384384 A1 Dec. 10, 2020

(30) Foreign Application Priority Data

Jul. 13, 2017 (GB) .................................... 1711249

(51) Int. Cl.
*B01D 15/22* (2006.01)
*B01D 15/18* (2006.01)
(Continued)

(52) U.S. Cl.
CPC ......... *B01D 15/22* (2013.01); *B01D 15/1871* (2013.01); *B01D 15/1885* (2013.01);
(Continued)

(58) Field of Classification Search
None
See application file for complete search history.

(56) References Cited

U.S. PATENT DOCUMENTS 3,385,035 A 5/1968 Dixmier et al.
4,676,898 A 6/1987 Saxena
(Continued)

FOREIGN PATENT DOCUMENTS

WO 2009/002780 A1 12/2008
WO 2015/138850 A1 9/2015

OTHER PUBLICATIONS

PCT International Search Report and Written Opinion for PCT Application No. PCT/EP2018/068290 mailed Oct. 24, 2018 (9 pages).
Great Britain Search Report for GB Application No. 1711249.1 mailed Feb. 1, 2018 (6 pages).
Chinese Office Action for CN Application No. 201880046336.8 mailed May 7, 2022 (22 pages).

*Primary Examiner* — Kara M Peo
(74) *Attorney, Agent, or Firm* — Eversheds-Sutherland (US) LLP

(57) ABSTRACT

The invention discloses a bioprocess chromatography column comprising: a) a bed chamber delimited by at least one side wall, a first bed support screen and a second bed support screen; b) a first end wall, secured to or integral with the side wall(s), with a first port fluidically connected via a first distributor to the first bed support screen; c) a second end wall, secured to or integral with the side wall(s), with a second port fluidically connected via a second distributor to the second bed support screen; d) a packing port in a wall; and e) an internal bracing, secured to, or integral with, at least one of the end walls and extending into the bed chamber.

30 Claims, 6 Drawing Sheets

(51) Int. Cl.

| | |
|---|---|
| B01D 15/20 | (2006.01) |
| G01N 30/02 | (2006.01) |
| G01N 30/38 | (2006.01) |
| G01N 30/56 | (2006.01) |
| G01N 30/60 | (2006.01) |

(52) U.S. Cl.
CPC ........... B01D 15/206 (2013.01); G01N 30/38 (2013.01); G01N 30/56 (2013.01); G01N 30/6039 (2013.01); G01N 30/6043 (2013.01); *G01N 2030/027* (2013.01); *G01N 2030/562* (2013.01)

(56) References Cited

U.S. PATENT DOCUMENTS

| | | | | |
|---|---|---|---|---|
| 5,667,676 A * | 9/1997 | Alaska | ................. | B01D 15/206 210/656 |
| 2005/0035061 A1* | 2/2005 | Soderman | ............ | B01D 15/325 210/656 |
| 2014/0224738 A1 | 8/2014 | Gebauer | | |
| 2014/0263012 A1 | 9/2014 | Gebauer | | |
| 2015/0203529 A1* | 7/2015 | Godawat | ................. | A61L 2/081 530/417 |

* cited by examiner

CHROMATOGRAPHY COLUMN COMPRISING AN INTERNAL BRACING

CROSS REFERENCE TO RELATED APPLICATIONS

This application claims the priority benefit of PCT/EP2018/068290 filed on Jul. 5, 2018, which claims priority benefit of Great Britain Patent Application No. 1711249.1 filed on Jul. 13, 2017, the entire contents of which are hereby incorporated by reference herein.

TECHNICAL FIELD OF THE INVENTION

The present invention relates to a chromatography column for bioprocess separations. The invention also relates to a stack of chromatography columns, to methods of packing one or more chromatography columns and to methods of assembling stacks of chromatography columns.

BACKGROUND OF THE INVENTION

Columns used in liquid chromatography typically comprise a tubular body enclosing a packed bed of porous chromatography medium through which a carrier liquid flows, with separation taking place by partitioning between the carrier liquid and solid phase of the porous medium.

Prior to any separation process, the bed has to be prepared by starting from the particulate medium that is to be introduced into the column. The process of bed formation is called 'the packing procedure' and a correctly packed bed is a critical factor influencing the performance of a column containing a packed bed. Typically, the packed bed is prepared by slurry packing, i.e. consolidating a suspension of discrete particles in liquid, known as slurry that is pumped, poured, or sucked into the column. Once the predetermined volume of slurry has been delivered into the column it needs to be further consolidated and compressed by moving a movable adapter down the longitudinal axis of the column towards the bottom of the column, normally at a constant speed. The excess liquid during this procedure is expelled at the column outlet, while the media particles are retained by means of a filter material, a so-called 'bed support', with pores too small to allow the media particles to pass though. The packing process is complete once the packed bed has been compressed by the optimum degree of compression. Another approach for column slurry packing is the flow packing method, where compression of the porous structure is primarily achieved by applying a high flow rate over the column, hereby forming a porous structure starting at the outlet bed support. The resulting drag force on the particles in the porous structure causes eventually a pressure drop and a compression of the bed. The compressed bed is finally confined by bringing the adapter into position.

The efficiency of subsequent chromatographic separation relies strongly on 1) the liquid distribution and collection system at the fluid inlet and outlet of the packed bed, 2) the special orientation (also known as the packing geometry) of the media particles in the packed bed, and 3) the compression of the packed bed. If the compression of the packed bed is too low then chromatographic separations performed on that bed suffer from "tailing" and, generally, such insufficiently compressed beds are unstable. If the compression of the packed bed is too high then chromatographic separations performed by the bed suffer from "leading" and such over-compressed beds can affect throughput and binding capacity, and, in general, give much higher operating pressures. If the compression is optimum, then the separation peaks formed during use exhibit much less leading or tailing and are substantially symmetrical. The optimum degree of compression is also crucial for achieving good long-term stability of the porous structure, hereby securing optimal performance throughout a number of process cycles. The optimum degree of compression required for a column is determined experimentally for each column size (width or diameter), bed height, and media type.

A particular issue is that it is often desirable to scale chromatographic processes by parallel coupling of several columns in order to increase capacity. The variability of current packing procedures has however been a serious obstacle, since the permeabilities and correspondingly the flow velocities will vary between the individual columns, causing excessive band broadening over the parallel assembly. Methods of dry packing of swellable media have been suggested as a remedy to this problem (see US20140224738 and US20120267299, both of which are hereby incorporated by reference in their entireties).

Preparative columns for use in bioprocess separations need to be of relatively large diameters to accommodate sufficient bed volumes for the adsorption capacity needed. This means that the column needs to withstand significant forces from the hydrodynamic back pressure without rupture or deformation. Columns for repeated use are normally constructed with heavy end pieces of stainless steel and use hydraulics acting on the end pieces for counteracting the back-pressure forces. Single use columns need to be constructed from low cost materials such as plastics, which necessitates different constructions. Typically, the plastic end pieces are very thick to prevent bulging and they are held together by a plurality of external tie bars (see e.g. U.S. Pat. No. 8,702,983 and US20080017579, hereby incorporated by reference in their entireties). Even when using these remedies, the diameters of single use columns are limited though. Alternatively, a stack of single use columns may be clamped together by heavy stainless steel plates using hydraulics or threaded bars for compression (see e.g. US201330068671, hereby incorporated by reference in its entirety).

Accordingly, there is a need for single use bioprocess columns allowing lighter constructions to reduce the cost and to improve the convenience during use of the columns.

SUMMARY OF THE INVENTION

One aspect of the invention is to provide a compact bioprocess chromatography column suitable for single use applications. This is achieved by a column comprising:
   a) a bed chamber delimited by at least one side wall, a first bed support screen and a second bed support screen;
   b) a first end wall, secured to or integral with the side wall(s), with a first port fluidically connected via a first distributor to the first bed support screen;
   c) a second end wall, secured to or integral with the side wall(s), with a second port fluidically connected via a second distributor to the second bed support screen;
   d) a packing port in a wall; and
   e) an internal bracing, secured to, or integral with, at least one of the end walls and extending into the bed chamber.
   One advantage is that a lighter construction is enabled. A further advantage is that no cumbersome external tie bars or compression plates are needed.

A second aspect of the invention is a stack of chromatography columns, assembled from a plurality of chromatography columns as disclosed above.

A third aspect of the invention is a method of packing the above column by transferring a weighed amount of dry swellable separation matrix particles to said bed chamber; and conveying a liquid to the column to swell the dry swellable separation matrix particles.

A fourth aspect of the invention is a method of preparing a stack of chromatography columns by packing the individual columns with the above method, stacking them and connecting them to each other in series or in parallel.

Further suitable embodiments of the invention are described in the dependent claims.

DRAWINGS

DEFINITIONS

Figure 1:
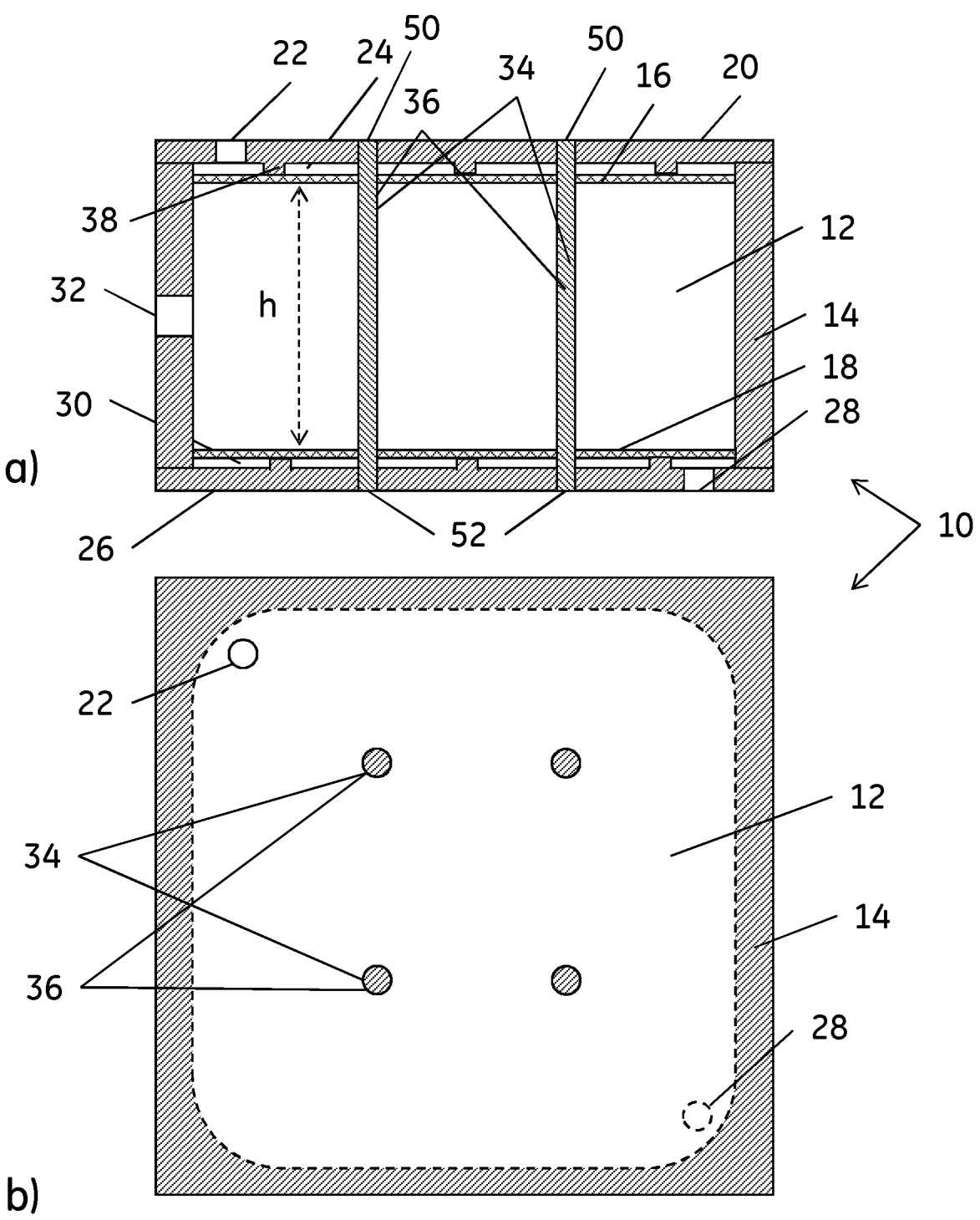
FIG. 1 shows a column of the invention, a) side view, b) end view.

To more clearly and concisely describe and point out the subject matter of the claimed invention, the following definitions are provided for specific terms that are used in the following description and the claims appended hereto.

The singular forms "a" "an" and "the" include plural referents unless the context clearly dictates otherwise. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. Unless otherwise indicated, all numbers expressing quantities of ingredients, properties such as molecular weight, reaction conditions, so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least each numerical parameter should be construed in light of the number of reported significant digits and by applying ordinary rounding techniques.

As used herein to describe the present invention, directional terms such as "up", down", "upwards", "downwards", "top", "bottom", "vertical", "horizontal", "above", "below" as well as any other directional terms, refer to those directions in the appended drawings.

DETAILED DESCRIPTION OF EMBODIMENTS

Figure 2:
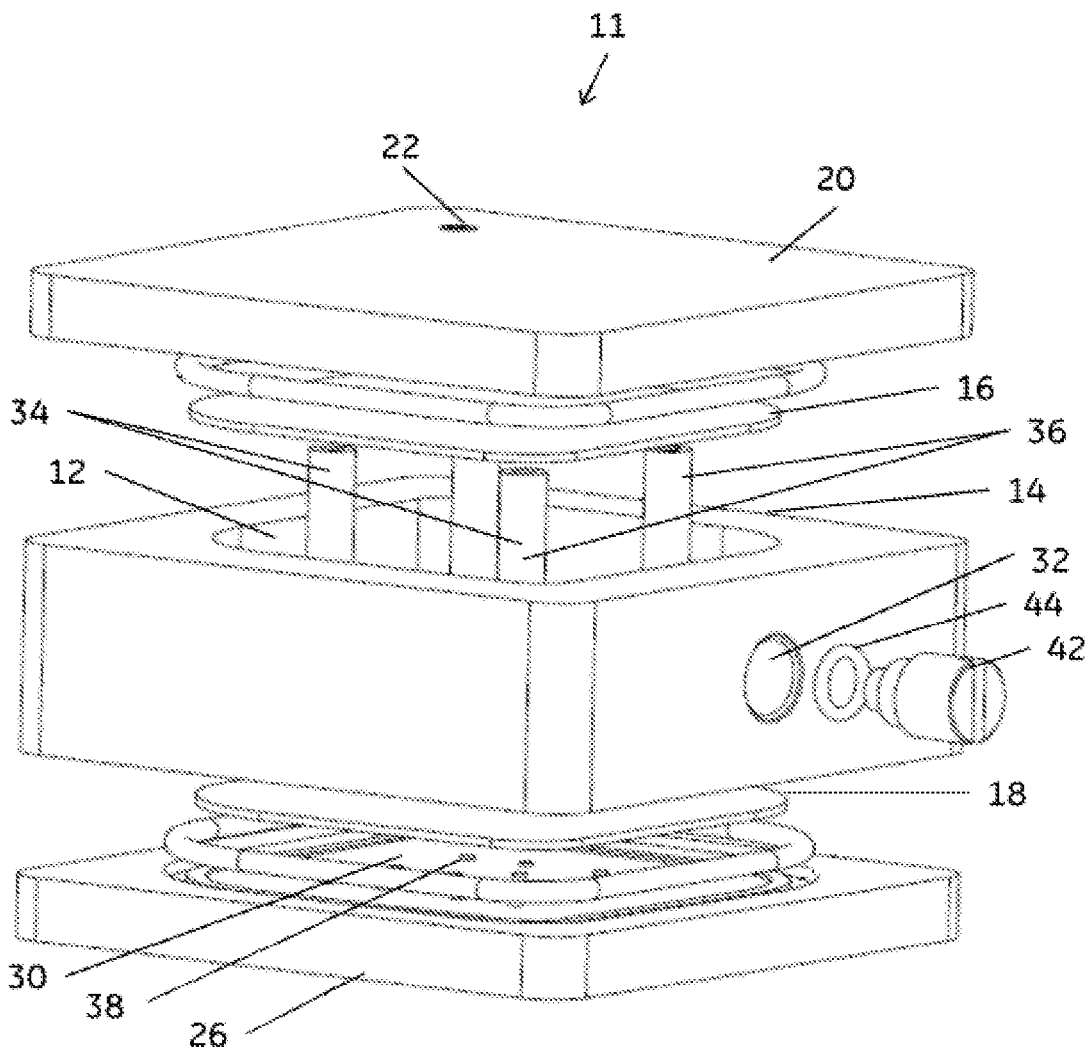
FIG. 2 shows an exploded view of a column of the invention.

In one aspect, illustrated by FIGS. 1-4, the present invention discloses a chromatography column 10;11;110;111 for bioprocess separations. The column may be stackable with like chromatography columns and comprises:

a) A bed chamber 12 delimited by at least one side wall 14, a first bed support screen 16 and a second bed support screen 18. The bed chamber provides the space for the packed bed, with the first and second bed support screens delimiting the chamber in the axial direction, in direct contact with the bed, while allowing liquids to pass through the screens and the bed. In the radial direction, the bed is delimited by the side wall(s), also in direct contact with the bed—one side wall if the bed chamber has a circular or elliptic cross section and a plurality of side walls if the bed chamber has a polygonal or essentially polygonal cross section. The bed chamber can suitably have an essentially tetragonal cross section, such as e.g. a cross section shaped as a right-angled or rhombic tetragon, a tetragon with rounded corners, a superellipse or a squircle. The essentially tetragonal cross section is advantageous particularly if the column is to be used with a horizontal flow direction, either alone or as a horizontal stack of columns. The maximum dimension of the bed chamber cross section (the diameter in case of a circle and a diagonal in case of an essentially tetragonal shape) can suitably be at least 5 cm, such as at least 10 cm, at least 20 cm, 5-50 cm or 10-30 cm. The bed support screens can e.g. be sheets of porous material with a pore size suitable for retaining separation matrix particles within the bed chamber. An example of a suitable material is sintered polyolefin sheets available from e.g. Porex Corp. or Porvair plc. Suitably, the edges of the bed support screens are in sealing abutment with, or integral with, the side wall(s), to prevent any leakage of separation matrix particles from the packed bed filling the bed chamber.

b) A first end wall 20, secured to or integral with the side wall(s), with a first port 22 fluidically connected via a first distributor 24 to the first bed support screen. The first port is used as an inlet/outlet during use of the column and the distributor provides a homogeneous flow over the entire bed cross section. The distributor can, as shown in FIG. 1 *a*), be a gap between the first bed support screen 16 and the first end wall 20, provided by spacers 38. Alternatively, it can be a more complex structure, e.g. with ribs or channels specifically designed to distribute the liquid over the cross section. Such structures are well known in the art of chromatography columns.

c) A second end wall 26, secured to or integral with the side wall(s), with a second port 28 fluidically connected via a second distributor 30 to the second bed support screen. The second port is used as an outlet/inlet during use of the column and the construction of the second distributor can be similar to, or identical to, the first distributor. If the bed chamber has an essentially tetragonal cross section, the first and the second ports can suitably be located adjacent to diagonally opposite corners of the bed chamber. If the column is arranged for horizontal flow, this allows entry of the liquid in a lowermost location and exit of the liquid in an uppermost location, which provides for efficient air removal from the column. The first and the second end walls can suitably be made from plastics, e.g. low-cost plastics such as polyolefins, to provide for a single use construction. Also, the side wall(s) may be made from plastics, e.g. polyolefins. The first and second ports 22,28 may be fitted with aseptic connectors or closed lengths of weldable flexible tubing. This allows use of the column as a presterilized column, where the aseptic connectors may be connected to a sterile chromatography system or to connect with other sterile columns in a stack. Alternatively, the closed lengths of sterile tubing may be used for connection with the system or other columns by sterile welding of the flexible tubing as known in the art of sterile connections. The sterilization, e.g. by radiation sterilization, may be performed after the column has been filled with separation matrix particles. It is however also possible to sterilize an empty column for later packing with sterilized separation matrix particles under aseptic conditions.

d) A packing port 32 in a wall, such as in a side wall. The packing port can e.g. be a hole in the side wall, allowing addition of dry swellable separation matrix particles during packing as described below. As shown in FIG. 2, the packing port can e.g. be closed with a (threaded) plug 42, sealed by a gasket or O-ring 44.

e) An internal bracing 34;134, secured to, or integral with, at least one of the first and second end walls and extending into the bed chamber. The bracing is a structure arranged inside the bed chamber to dissipate the longitudinal tension loads acting on the end walls as a result of the back-pressures occurring during use of the column. Thus, it counteracts any tendency towards bulging of the end walls, which would cause instabilities in the packed bed and lead to poor chromatographic performance. If the bracing is secured to, or integral with, both of the first and second end walls, it can also reduce the tension load on the joints between the end walls and the side wall(s), allowing a more slender construction. The securing of the bracing to the end wall(s) can be by fastening elements such as screws etc., by e.g. welding or it may be integrally formed with the end wall(s). The latter may e.g. be achieved by additive manufacturing (also known as 3-D printing), which can also allow integral forming of the bed support screens and/or the side wall(s) with the end walls and the bracing. Suitably, at least part of the bracing extends into the bed chamber to at least 20%, such as at least 50%, of the axial height h of the bed chamber. For maximal reinforcement effect it is advantageous if at least part of the bracing spans the entire axial height of the bed chamber, being secured to, or integral with, both of the first and second end walls.

In some embodiments 10;11, illustrated by FIGS. 1 and 2, the internal bracing 34 comprises one or more rods 36. Each of these has a first rod end 50 secured to, or integral with, the first end wall and a second rod end 52 secured to, or integral with, the second end wall. Suitably, the number of rods is at least two, such as at least three or at least four. The number of rods may be dependent on the size of the column, e.g. with four rods being sufficient for a column of 10-15 cm cross section dimension and a larger number for wider columns. This ensures sufficient resistance against bulging and/or longitudinal failure.

Figure 3:
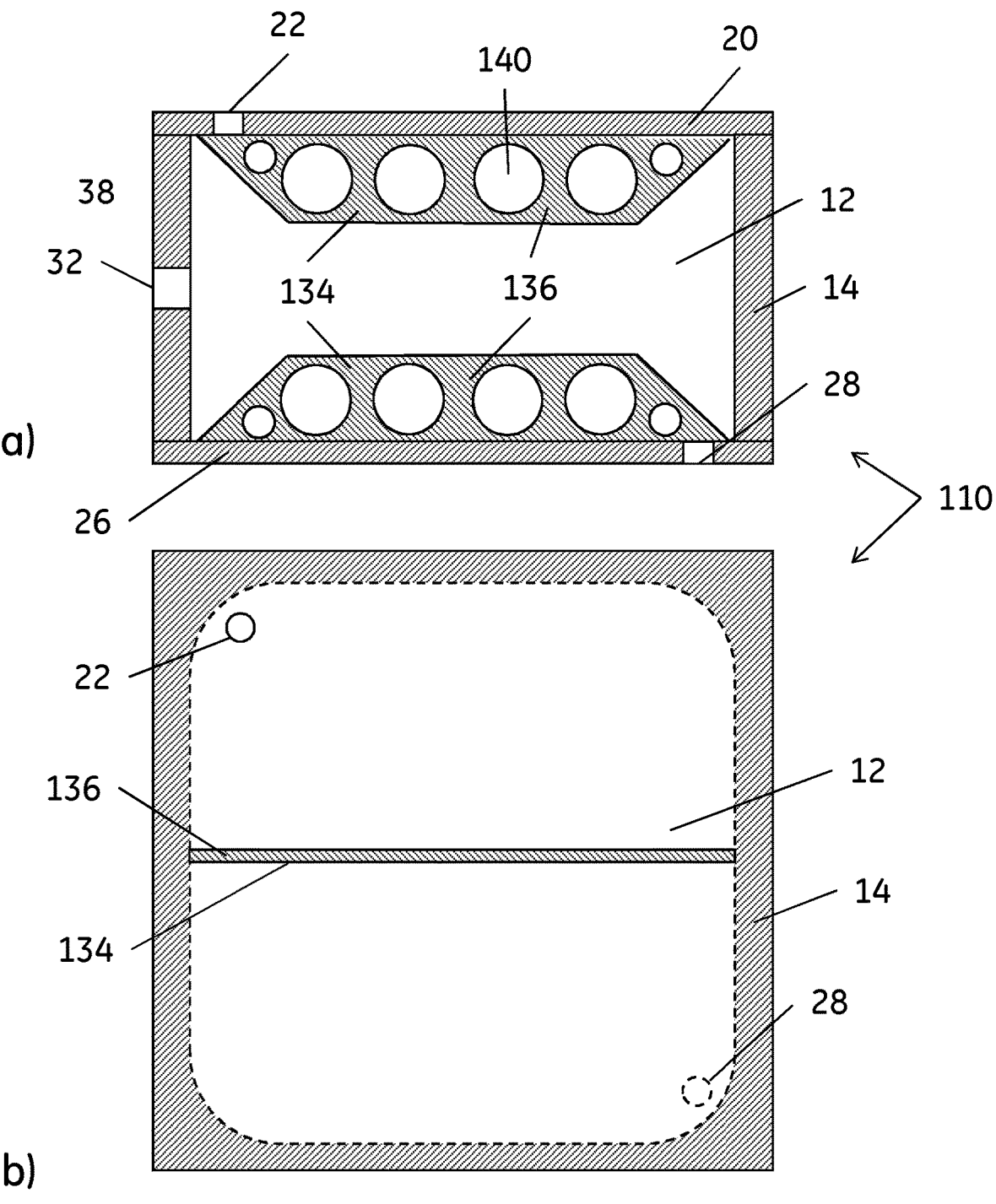
FIG. 3 shows a column of the invention, a) side view, b) end view.
Figure 4:
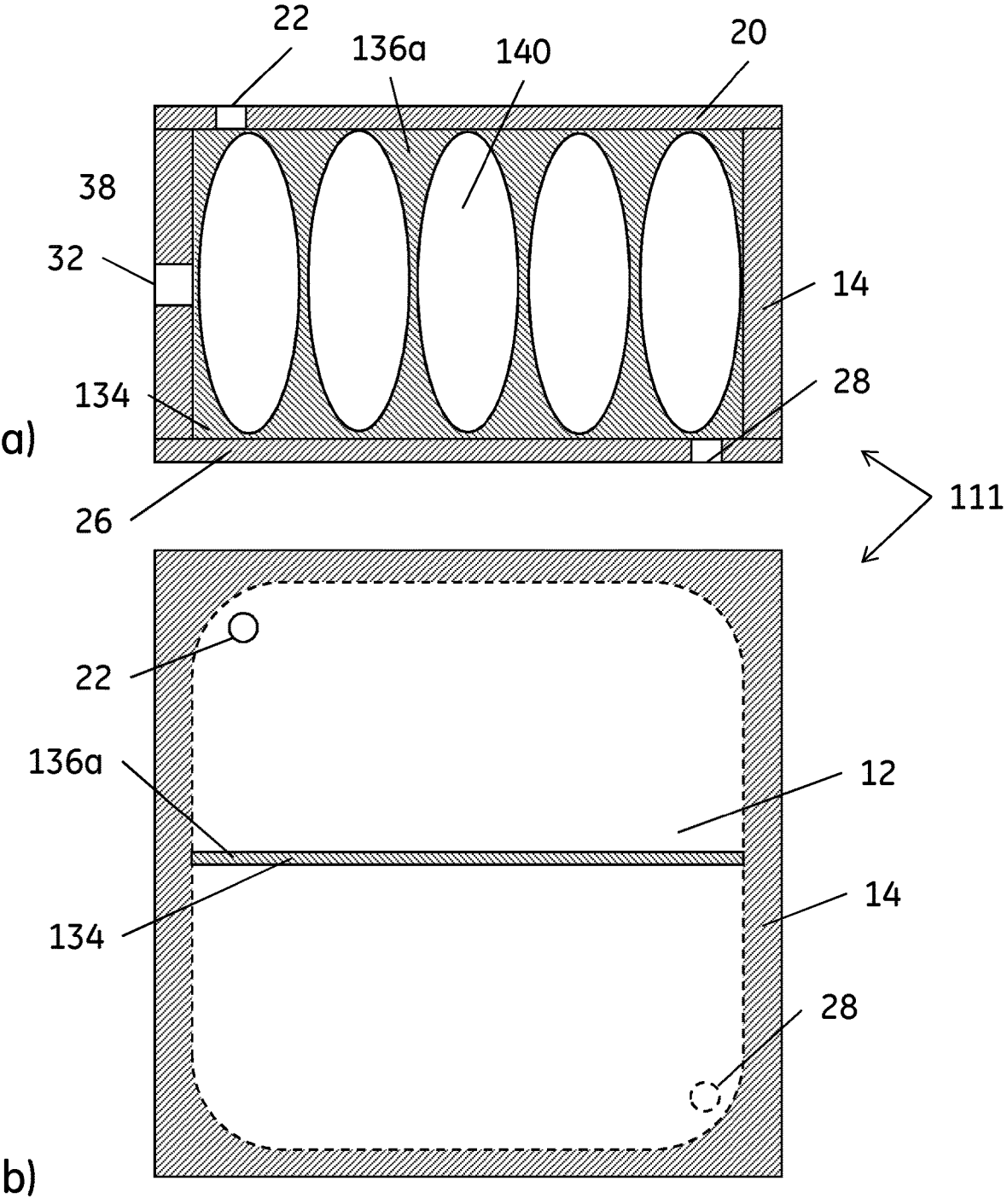
FIG. 4 shows a column of the invention, a) side view, b) end view.

In certain embodiments 110;111, illustrated by FIGS. 3 and 4, the internal bracing 134 comprises at least one rib 136, secured to, or integral with, at least one of the first and second end walls and extending into the bed chamber. The rib(s) can suitably comprise at least one lateral hole 140, such as a plurality of lateral holes. The lateral holes provide fluid communication between the different parts of the column. Lateral holes also provide communication for the separation matrix particles, especially in a dry state prior to swelling, hereby allowing for an even distribution of the dry swellable particles after filling through the packing port. As illustrated in FIG. 4, the rib(s) 136a may be secured to, or integral with, both of the first and second end walls. In this case the rib 136a may also be termed an internal wall. The column may comprise several ribs, which can either be arranged parallel to each other or in a cross or star pattern. In certain embodiments, in especially when the bed chamber is formed as a circular or elliptical shape, the internal bracing may be formed as a circular (cylindrical) or elliptical wall inside the bed chamber.

In some embodiments, the column may comprise one or more sensors, allowing in-line measurement of important parameters inside the column. The sensors may e.g. be capable of measuring pressure, conductivity, pH and/or temperature.

In certain embodiments, the bed chamber 12 comprises a packed bed of separation matrix particles, with direct contact between the separation matrix particles and the at least one side wall 14, the first and second bed support screens 16,18 and the internal bracing 34. The packed bed can suitably comprise swollen particles packed by the packing method discussed below.

Figure 5:
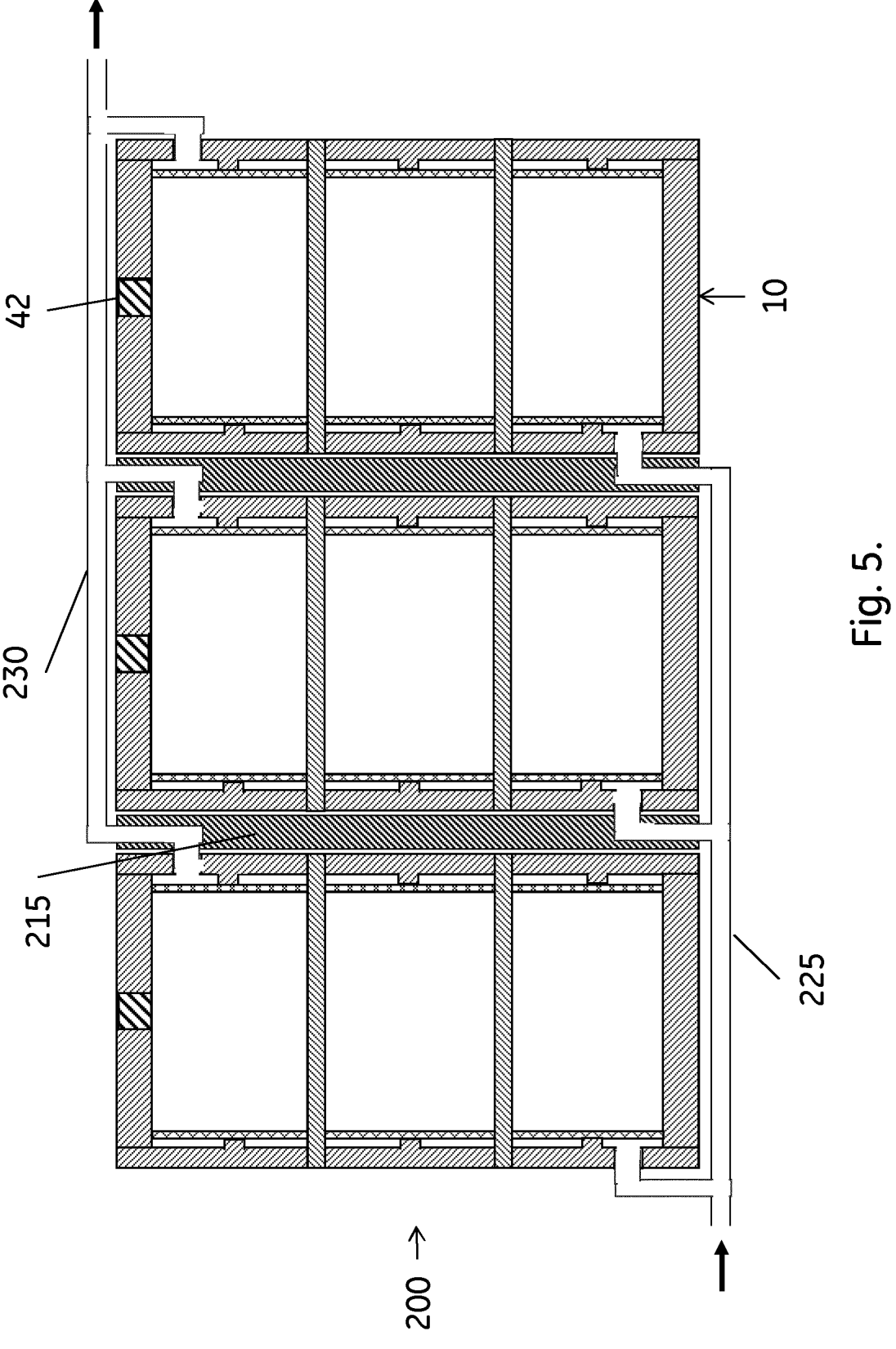
FIG. 5 shows a stack of the FIG. 1 columns, with the columns coupled in parallel.
Figure 6:
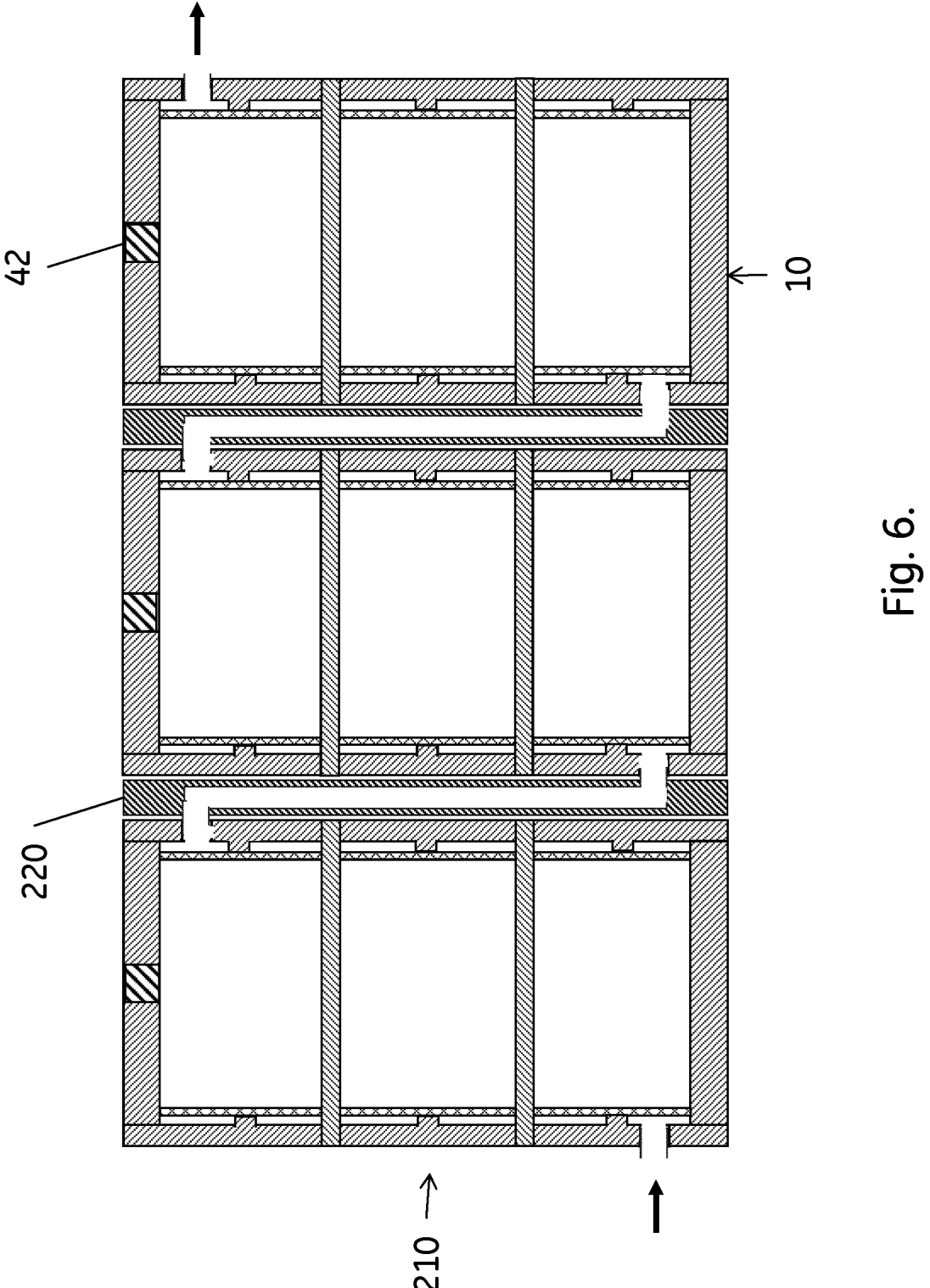
FIG. 6 shows a stack of the FIG. 1 columns, with the columns serially coupled.

In a second aspect, illustrated by FIGS. 5 and 6, the invention discloses a stack 200;210 of stackable chromatography columns as disclosed above. The columns in the stack may be connected in parallel, as illustrated in FIG. 5. They can also be serially connected, as illustrated in FIG. 6, or the stack may comprise sub-stacks of serially connected columns, where the sub-stacks are connected in parallel. The columns can suitably be packed with the same separation matrix and the difference in the dry weight of the separation matrix amounts of any two chromatography columns in the stack may be less than 5 wt. %, such as less than 2 wt. %. This ensures high efficiency of the stack, particularly when the columns are connected in parallel. Then, the low weight difference leads to essentially identical flow rates through the parallel columns.

One way of achieving the parallel or serial connections of the columns is to use fluidic connector plates 215;220 between the columns. Serial connection may be obtained with only serial connector plates 220, connecting the outlet of one column with the inlet of the subsequent column. For parallel connection, also a common inlet conduit 225 and a common outlet conduit 230 may be needed. The common inlet conduit allows the inflow to reach all column inlets and the common outlet conduit collects outflow from all column outlets. The common inlet/outlet conduits can be separate tubes as indicated in FIG. 5, but they can also be integrally formed in e.g. the column side wall(s).

The stack may be held together by fasteners between the individual columns (not shown) and/or by a frame. As no clamping pressure is needed to counteract bulging or longitudinal failure, the frame can be a comparatively light construction and may or may not include light end plates.

In a third aspect, the invention discloses a method of packing a chromatography column, comprising the steps of:

a) providing the chromatography column 10;11;110;111 as disclosed above;

b) transferring a weighed amount of dry swellable separation matrix particles to the bed chamber 12; and c) conveying a liquid to the column to swell the dry swellable separation matrix particles. The liquid can typically be water or an aqueous solution, such as a buffer or a salt solution. During or after step c), the column may be mechanically perturbed, e.g. by subjecting it to vibration, in order to get a more homogeneous distribution of the swollen particles. Details of suitable vibration methods are given in co-pending PCT application EP2017/064876, which is hereby incorporated by reference in its entirety.

The method may, before step b), comprise a step of determining the liquid uptake of the dry swellable separation matrix particles, suitably using the same liquid as in step c). In step b) the amount of dry swellable separation matrix particles may then be calculated, based on the liquid uptake measurement, to give a non-constrained swollen volume of more than 100%, such as 101-130% or 105-120% of the inner volume of the bed chamber. The liquid uptake Vs/md can be determined from a separate sample aliquot of the particles, using established methods for taking representative samples. The sample is weighed dry (i.e. in equilibrium with the ambient atmosphere) and is then suspended in a test liquid. The test liquid can be the same liquid to be used in the packing and operation of the column or a liquid of similar composition; typically an aqueous buffer or salt solution of similar ionic strength/conductivity and pH. The particles in the test liquid are left to equilibrate, typically for about one hour and in any case not more than 24 hours. The particles are resuspended and left to sediment. The sediment volume is measured e.g. in a measuring cylinder. The liquid uptake is then calculated as the ratio Vs/md between the sediment volume Vs and the weight and of the dry particle sample. An advantage of initially measuring the liquid uptake is that the swollen volume of the particles in the column can be predicted, resulting in better control of the compression and column efficiency. In a specific embodiment the liquid uptake is determined with less than 5% coefficient of variation or even less than 2% coefficient of variation to allow for high precision in the control of the column performance.

In some embodiments, the method comprises before step c) a step of radiation sterilizing the chromatography column with the dry swellable separation matrix particles. Dry particles are often more stable towards radiation than swollen particles, so this method can decrease potential radiation degradation. It is then easy to perform step c) with sterile (e.g. sterile filtered) liquid to maintain the sterility. Alternatively, the chromatography column and the dry swellable separation matrix particles may each be radiation sterilized before step a), with steps b) and c) being carried out under aseptic conditions. Yet another alternative is to radiation sterilize the column after step c). This is a convenient procedure, particularly in the case where the swollen particles are reasonably resistant to radiation degradation.

The packed column may be used for separation of at least one biomolecule such as a biopharmaceutical. Suitable biomolecules can be proteins, peptides, nucleic acids, carbohydrates, virus particles etc. Suitable biopharmaceuticals can be immunoglobulins (e.g. monoclonal antibodies), immunoglobulin fragments and other constructs, insulin and other therapeutic peptides, erythropoietin, plasma proteins, oligonucleotides, plasmids, vaccines etc. In a specific embodiment the biomolecule or biopharmaceutical is a protein.

In some embodiments the biomolecule or biopharmaceutical binds to the particles and at least one impurity is removed by washing with a washing liquid. The biomolecule or biopharmaceutical may then be eluted from the particles with an elution liquid. This mode is often called bind-elute separation and is particularly useful when the amount of impurities is significant and/or when a very high separation selectivity is required.

In certain embodiments at least one impurity binds to the particles and the biomolecule or biopharmaceutical is recovered in the flow-through of the column. This mode is often called flow-through separation and provides a very high throughput, particularly when the amount of impurities is relatively low.

In a fourth aspect, the invention discloses a method of preparing a stack of chromatography columns, comprising the steps of:

1) packing a plurality of chromatography columns according to the methods disclosed above; and 2) stacking the chromatography columns and connecting them to each other in series or in parallel as discussed above.

The amounts of dry swellable separation matrix particles of any two chromatography columns in the stack can suitably differ by less than 5 wt. %, such as by less than 2 wt. %.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. All patents and patent applications mentioned in the text are hereby incorporated by reference in their entireties as if individually incorporated.

The invention claimed is:

1. A chromatography column for bioprocess separations, said column comprising:

a) a bed chamber delimited by at least one side wall in a radial direction, and a first bed support screen and a second bed support screen in an axial direction, wherein said first and second bed support screens are sheets of porous material, arranged to retain separation matrix particles within the bed chamber;

b) a first end wall, secured to or integral with said at least one side wall, with a first port fluidically connected via a first distributor to said first bed support screen;

c) a second end wall, secured to or integral with said at least one side wall, with a second port fluidically connected via a second distributor to said second bed support screen;

d) a packing port in one of said at least one side wall and first and second end walls; and e) an internal bracing secured to, or integral with, at least one of said first and second end walls and extending into said bed chamber, wherein said internal bracing comprises at least two rods, and is configured to dissipate longitudinal tension loads acting on said first and second end walls as a result of back-pressures that occur during use of the column, and wherein at least part of said internal bracing spans the entire axial height of the bed chamber, being secured to, or integral with, both of the first and second end walls.

2. The chromatography column of claim 1, wherein each of the at least two rods of said internal bracing comprises a first rod end secured to, or integral with, said first end wall and a second rod end secured to, or integral with, said second end wall.

3. The chromatography column of claim 1, wherein said internal bracing comprises at least three rods extending from said first end wall to said second end wall.

4. The chromatography column of claim 1, wherein said internal bracing comprises at least one rib secured to, or integral with, at least one of said first and second end walls and extending into said bed chamber.

5. The chromatography column of claim 4, wherein said at least one rib comprises at least one lateral hole.

6. The chromatography column of claim 4, wherein said at least one rib is secured to, or integral with, both of said first and second end walls.

7. The chromatography column of claim 1, which is a single use column, with at least said first and second end walls made of plastics.

8. The chromatography column of claim 1, wherein said packing port is located in said at least one side wall.

9. The chromatography column of claim 1, wherein said bed chamber has a cross section diameter or diagonal of at least 10 cm.

10. The chromatography column of claim 1, wherein said bed chamber has a generally tetragonal shape.

11. The chromatography column of claim 10, wherein said first and second ports are located adjacent to diagonally opposite corners of said bed chamber.

12. The chromatography column of claim 1, wherein said side wall(s), said first and second end walls and said internal bracing are integrally formed.

13. The chromatography column of claim 12, wherein said side wall(s), said first and second end walls, said internal bracing and said first and second bed support screens are integrally formed.

14. The chromatography column of claim 1, further comprising one or more sensors capable of measuring pressure, conductivity, pH and/or temperature.

15. The chromatography column of claim 1, wherein said first and second ports are fitted with aseptic connectors or closed lengths of weldable flexible tubing.

16. The chromatography column of claim 1, wherein said bed chamber is filled with a packed bed of the separation matrix particles.

17. The chromatography column of claim 1, wherein said first and second ports are fitted with aseptic connectors or closed lengths of weldable flexible tubing and wherein said chromatography column is presterilized.

18. The chromatography column of claim 1, which is stackable with like chromatography columns.

19. A stack comprising a plurality of chromatography columns according to claim 18.

20. The stack of claim 19, wherein the chromatography columns are serially connected.

21. The stack of claim 19, wherein the chromatography columns are connected in parallel.

22. The stack of claim 21, wherein each of the chromatography columns contains a packed bed of the separation matrix particles, and wherein the difference in the dry weight of the separation matrix amounts of any two chromatography columns in the stack is less than 5 wt. %.

23. A method of packing a chromatography column, comprising the steps of:
   a) providing the chromatography column of claim 1;
   b) transferring a weighed amount of dry swellable separation matrix particles to said bed chamber; and
   c) conveying a liquid to the column to swell the dry swellable separation matrix particles.

24. The method of claim 23, comprising, before step b), a step of determining the liquid uptake of the dry swellable separation matrix particles and wherein in step b) the amount of dry swellable separation matrix particles is calculated to give a non-constrained swollen volume of more than 100% of an inner volume of said bed chamber.

25. The method of claim 24, wherein the amount of dry swellable separation matrix particles is calculated to give a non-constrained swollen volume of 101-130% of the inner volume of said bed chamber.

26. The method of claim 23, wherein said liquid is water, a buffer, or a salt solution.

27. The method of claim 23, comprising before step c) a step of radiation sterilizing the chromatography column with the dry swellable separation matrix particles.

28. The method of claim 23, wherein, before step a), said chromatography column and said dry swellable separation matrix particles are radiation sterilized and wherein the method is carried out under aseptic conditions.

29. A method of preparing a stack of chromatography columns, comprising the steps of:
   1) Packing a plurality of chromatography columns according to the method of claim 23; and
   2) stacking said chromatography columns and connecting them to each other in series or in parallel.

30. The method of claim 29, wherein the weighed amounts of dry swellable separation matrix particles of any two chromatography columns in the stack differ by less than 5 wt. %.

* * * * *